(12) United States Patent
Damgar et al.

(10) Patent No.: US 10,761,778 B2
(45) Date of Patent: Sep. 1, 2020

(54) AGGREGATION OF READ REQUESTS REQUESTING COMMON DATA OBJECTS INTO A COMMON READ OPERATION IN A DATA STORAGE SYSTEM FOR IMPROVING THROUGHPUT

(71) Applicant: International Business Machines Corporation, Armonk, NY (US)

(72) Inventors: James E. Damgar, Tucson, AZ (US); Errol J. Calder, Vail, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/177,192

(22) Filed: Oct. 31, 2018

(65) Prior Publication Data
US 2020/0133569 A1   Apr. 30, 2020

(51) Int. Cl.
*G06F 3/06* (2006.01)
*G06F 9/48* (2006.01)

(52) U.S. Cl.
CPC .......... *G06F 3/0659* (2013.01); *G06F 3/0613* (2013.01); *G06F 3/0641* (2013.01); *G06F 3/0673* (2013.01); *G06F 9/4881* (2013.01)

(58) Field of Classification Search
CPC .................... G06F 11/1453; G06F 3/0641
See application file for complete search history.

(56) References Cited

U.S. PATENT DOCUMENTS

| | | | |
|---|---|---|---|
| 9,858,209 B1 | 1/2018 | Genda | |
| 2014/0074794 A1* | 3/2014 | Chavda | G06F 11/1453 707/679 |
| 2015/0242129 A1* | 8/2015 | Hasan | G06F 3/0611 711/114 |
| 2016/0147797 A1 | 5/2016 | Dolph et al. | |
| 2016/0306820 A1 | 10/2016 | Agrawal et al. | |
| 2017/0060422 A1* | 3/2017 | Sharifie | G06F 3/061 |
| 2019/0087126 A1* | 3/2019 | Chun | G06F 3/0659 |
| 2019/0196972 A1* | 6/2019 | Benisty | G06F 12/0246 |
| 2019/0227743 A1* | 7/2019 | Hamilton | G06F 3/0604 |

OTHER PUBLICATIONS

Fegade et al., "In-line Deduplication for Cloud storage to Reduce Fragmentation by using Historical Knowledge," International Journal of Computer Science and Information Technologies, vol. 7, No. 4, 2016, pp. 1918-1921.

* cited by examiner

*Primary Examiner* — Edward J Dudek, Jr.
(74) *Attorney, Agent, or Firm* — Zilka-Kotab, P.C.

(57) ABSTRACT

A computer-implemented method according to one embodiment includes suspending a parent/control thread of a data storage system, and receiving a plurality of read requests while the parent/control thread is suspended, each read request having storage information associated therewith. The computer-implemented method further includes resuming the parent/control thread, analyzing the read requests, aggregating read requests requesting common data objects into a common read operation, and dispatching the common read operation to a multi-threaded I/O layer of the data storage system for retrieving data associated with the read requests. The analyzing includes sorting the read requests using the associated storage information.

18 Claims, 7 Drawing Sheets

{PARENT-THREAD}:
The thread that is responsible for analyzing a set of read requests and dispatching them to IO worker threads.

PSUEDO-CODE:
- Initialize a hash data structure "readReqs" which maps (containerID, offSet, length, thread-ID) Tuple objects -> ReadRequest objects.
- The Tuple class includes a comparator for efficient sorting based on (containerID, offSet, length)
- The ReadRequest object contains the following fields:
  - Tuple of (containerID, offSet, length) indicating the read request to be executed
  - A List of buffer references - each mapping to a REQUEST-THREAD's request for this read request
  - A List of notification objects that REQUEST-THREADs for this read request wait on for their buffer to be ready

- LOOP forever:
  - Sleep AGGREGATION_THREAD_SLEEP_MILLIS milliseconds
  - If the readReqs contains entries:
    - Lock the readReqs hash. This will wait until all REQUEST-THREADs have finished with the critical section of code where they're adding their request to the hash. No other threads will be permitted in after this lock is started.
    - Sort the readReqs hash by (containerID, offSet, length)
    - Collapse entries containing the same (containerID, offSet, length) into a single ReadRequest object
      - This indicates that multiple threads are requesting the same (containerID, offSet, length)
    - WHILE there are still entries in readReqs:
      - Keep adding entries to a ReadWorkItem object so long as the following criteria are met:
        - There are still entries in readReqs
        - We haven't changed container value
        - We haven't exceeded MAX_AGGREGATE_READ_SIZE_MB for the aggregation buffer that will be needed to satisfy this combined read
        - We haven't exceeded MAX_WASTED_SPACE_PERCENT % of the potential aggregation buffer satisfying this combined read
      - The ReadWorkItem contains the following:
        - A List of sorted ReadRequest objects representing a cloud read to perform
      - When a ReadWorkItem entry is ready, dispatch it to a new READ-DISPATCH-THREAD if there is capacity (max of MAX_DISPATCH_THREADS at one time are allowed)
      - If for some reason there isn't capacity, block here and wait until there is an ability to dispatch another thread
      - Note that it should be OK that we still have the readReqs hash locked here since # dispatch threads should be <= number of de-duplicatin layer restore threads so there won't be anyone waiting if we're blocked here.
    - END WHILE
    - Delete all entries in the readReqs hash (or re-initialize)
    - Unlock the readReqs hash (to allow REQUEST-THREADs to once more add their entries)
  - END IF
- END LOOP

{REQUEST-THREAD}:
These threads represent incoming threads from the de-duplication layer that have a buffer to fill with a (containerID, offSet, length) request.

*PSUEDO-CODE:*
- Initialize a ReadRequest object containing the following:
  - Tuple of (containerID, offSet, length) indicating the read request to be executed
  - Add just this thread's buffer reference to the List of buffers (PARENT-THREAD could merge this with another ReadRequest later)
  - Add just this thread's notification object to the List of objects (PARENT-THREAD could merge this with another ReadRequest later)
- Wait to access the readReqs hash (could be locked out due to PARENT-THREAD and need to wait)
- Add our ReadRequest entry to the hash using (containerID, offSet, length, thread-ID) as the key (so can have multiple of the same read request from multiple threads)
- Wait on our notification object that indicates our buffer is ready
- When notified, our buffer is ready. Return the buffer to the de-duplication layer and terminate.

{READ-DISPATCH-THREAD}:
These threads are responsible for performing the actual read from the cloud layer, filling in REQUEST-THREAD buffers, and notifying them when they are done.

*PSUEDO-CODE:*
- Examine our ReadWorkItem. If it contains just one entry with one REQUEST-THREAD buffer (worst case scenario):
  - Execute the cloud read using the single REQUEST-THREAD buffer (no buffer copying needed). Notify the requester.
- If the ReadWorkItem contains >1 entry or entries with >1 REQUEST-THREAD buffers exist:
  - Create a buffer large enough to fit all of the REQUEST-THREAD's requests and any wasted space in between
  - Execute the aggregated cloud read request
  - Iterate over the ReadRequests in the ReadWorkItem. For each one:
    - Copy relevant range of the large buffer into the ReadRequest's buffer(s)
  - Use the notification objects in the ReadRequest to notify the REQUEST-THREADs waiting on this request that their buffers are ready
  - Terminate when finished.

AGGREGATION OF READ REQUESTS REQUESTING COMMON DATA OBJECTS INTO A COMMON READ OPERATION IN A DATA STORAGE SYSTEM FOR IMPROVING THROUGHPUT

BACKGROUND

The present invention relates to data storage systems, and more specifically, this invention relates to aggregating read requests requesting common data objects into a common read operation in a data storage system for improving throughput and thereby reducing overall latency in the data storage system.

It is common practice within enterprise backup space to utilize data deduplication technologies to reduce the quantity of data stored as a part of a backup or storage solution. This is often done at either a software or a hardware layer of a data storage system, to reduce storage costs for collections of data or data streams which possess commonly-shared data extents. For example, a fingerprinting algorithm analyzing a data stream from a backup client or source function typically splits the data into extents or "chunks" of a particular range of size. A database may be referenced to determine if data in an extent is already stored within the storage repository. If so, the data does not need to be stored again, but rather, the existing extent can be used to provide a copy of the data upon request for the data. Typically, a count of references is kept track of and object inventory tables are used to enable the backup or storage solution to reconstitute the front-end backup or storage object upon request by restoring the constituent deduplicated extents. It is common for data sources in production environments to feature data sources which deduplicate at 50% or greater, e.g., feature fingerprinted extents which are 50% common across objects or the overall stream. This technology is used and valued by users of storage technologies.

SUMMARY

A computer-implemented method according to one embodiment includes suspending a parent/control thread of a data storage system, and receiving a plurality of read requests while the parent/control thread is suspended, each read request having storage information associated therewith. The computer-implemented method further includes resuming the parent/control thread, analyzing the read requests, aggregating read requests requesting common data objects into a common read operation, and dispatching the common read operation to a multi-threaded I/O layer of the data storage system for retrieving data associated with the read requests. The analyzing includes sorting the read requests using the associated storage information.

A computer program product according to another embodiment includes a computer readable storage medium having program instructions embodied therewith. The computer readable storage medium is not a transitory signal per se. The program instructions are readable and/or executable by a computer to cause the computer to perform a method that includes receiving a plurality of read requests, each read request having storage information associated therewith. The method further includes analyzing the read requests, aggregating read requests requesting common data objects into a common read operation, and dispatching the common read operation to a multi-threaded I/O layer of the data storage system for retrieving data associated with the read requests. The analyzing includes sorting the read requests using the associated storage information.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 6A is pseudo-code in accordance with one embodiment.

FIG. 6B is pseudo-code in accordance with one embodiment.

FIG. 6C is pseudo-code in accordance with one embodiment.

DETAILED DESCRIPTION

Figure 1:
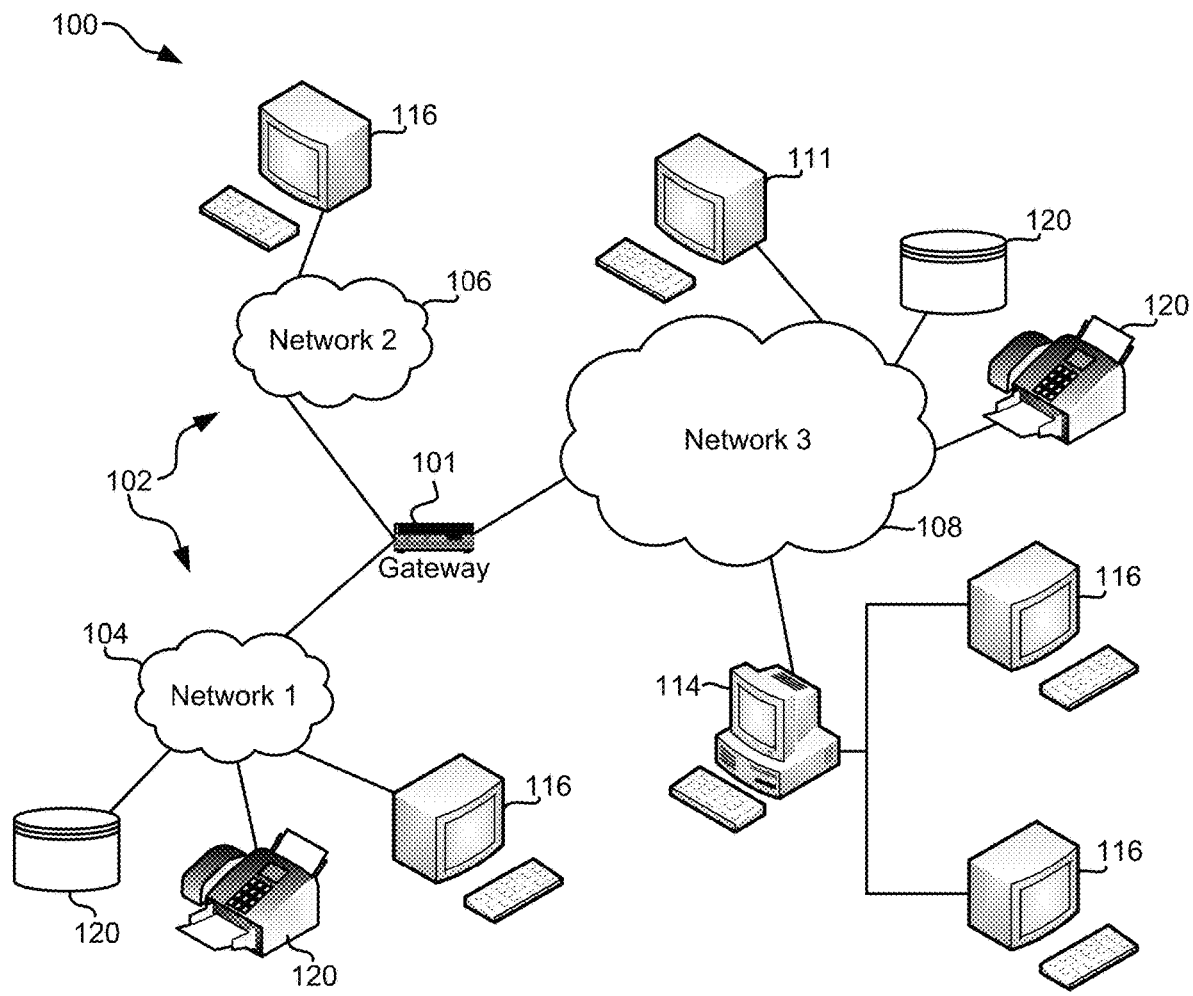
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for aggregating read requests requesting common data objects into a common read operation in a data storage system for improving throughput in the data storage system, thereby reducing overall latency. In preferred embodiments, a parent/control thread periodically awakens to examine a set of read requests representing extents that deduplication layer threads are currently waiting on. The requests are re-ordered and collapsed into aggregated requests that are satisfied by a quantity of I/O worker threads. The number of I/O worker threads may scale up to a same number of threads as the deduplication layer has incoming, in some approaches. In this way, any read aggregation results in an improvement in performance, compared to a naive solution that restores all deduplicated extents in parallel using individual threads.

In one general embodiment, a computer-implemented method includes suspending a parent/control thread of a data storage system, and receiving a plurality of read requests while the parent/control thread is suspended, each read request having storage information associated therewith. The computer-implemented method further includes resuming the parent/control thread, analyzing the read requests, aggregating read requests requesting common data objects into a common read operation, and dispatching the common read operation to a multi-threaded I/O layer of the data storage system for retrieving data associated with the read requests. The analyzing includes sorting the read requests using the associated storage information.

In another general embodiment, a computer program product includes a computer readable storage medium having program instructions embodied therewith. The computer readable storage medium is not a transitory signal per se. The program instructions are readable and/or executable by a computer to cause the computer to perform a method that includes receivinge a plurality of read requests, each read request having storage information associated therewith. The method further includes analyzing the read requests, aggregating read requests requesting common data objects into a common read operation, and dispatching the common read operation to a multi-threaded I/O layer of the data storage system for retrieving data associated with the read requests. The analyzing includes sorting the read requests using the associated storage information.

In another general embodiment, a system includes a processor, and logic integrated with the processor, executable by the processor, or integrated with and executable by the processor. The logic is configured to perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
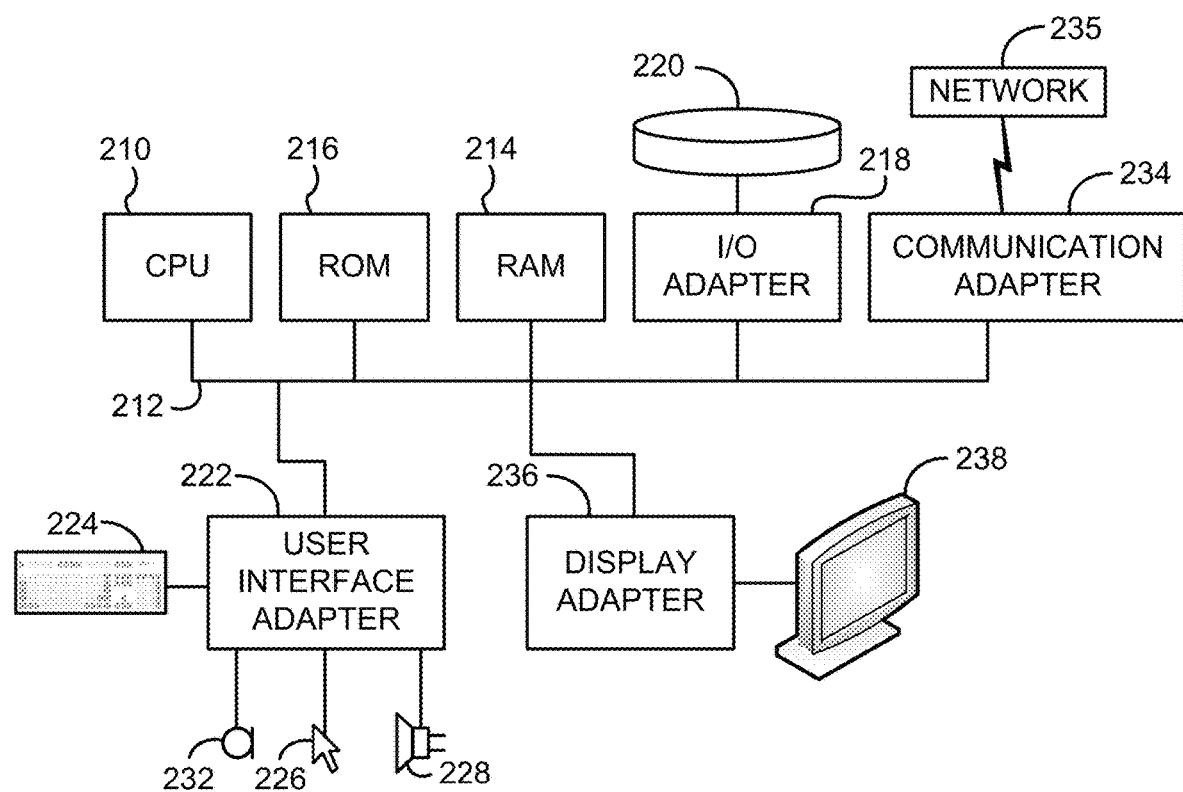
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
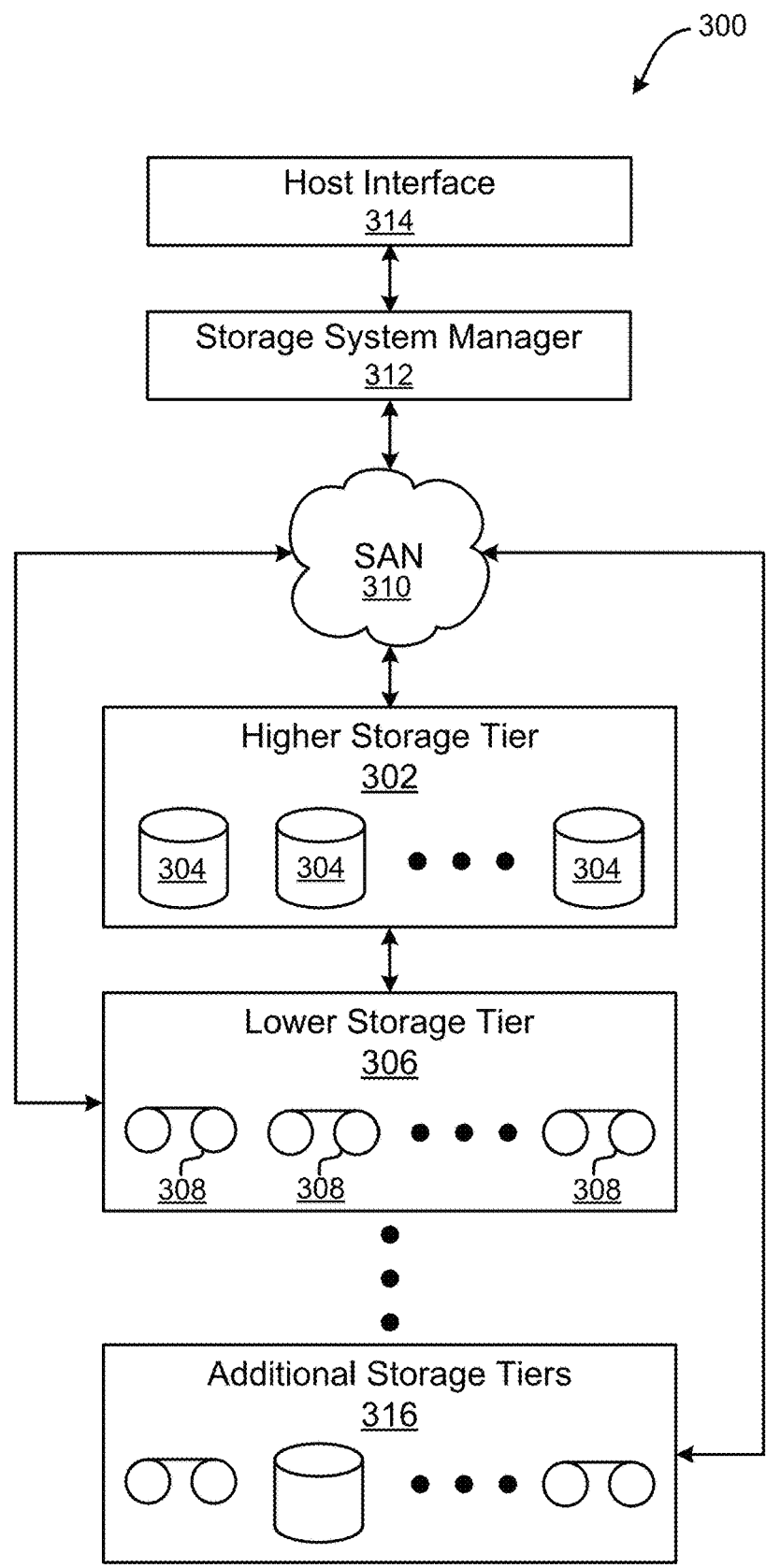
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned elsewhere above, it is common practice within enterprise backup space to utilize data deduplication technologies to reduce the quantity of data stored as a part of a backup or storage solution. In general, if a copy of data to be stored is already present in a storage system, the data is not written to storage. Rather, a deduplication process may, instead of writing a duplicate copy of the existing data, provide a pointer the existing data already in the storage system. This is often done at a software and/or a hardware layer of the data storage system, to reduce storage costs for collections of data or data streams which possess commonly-shared data.

However, conventional deduplication practices have a side effect that front-end objects, which may have initially been large (several gibibytes (GiBs) or more), are logically segmented into smaller pieces for storage. For example, such smaller segmented pieces are typically in the range of 50 kibibyte (KiB)-1 mebibyte (MiB). Moreover, rather than storing each of such objects in its entirety as a single unit, each object is stored instead by backup products into logical containers which collect new data extents into larger, aggregate pieces for storage as disk-based files or to cloud-based object storage systems storage as objects. Regarding the object storage case, this can be very advantageous for backup/ingest performance, as it is more effective for throughput in the latency-intensive representational state transfer architecture (RESTful), e.g., using a hypertext transfer protocol (HTTP), application program interface (API) space to make fewer calls with larger I/Os.

However, difficulties remain present and occur in the object storage case during restore. To restore a front-end object for a client, all data extents which make up the object are retrieved and reformed. In deduplication, these extents may not be sequential and could be spread over several logical containers in the object storage system. With disk-based files, latency is relatively low and the time to retrieve these pieces from disk is minimal (given a properly sized disk configuration). With cloud systems, retrieving relatively small pieces of data from object storage is latency-bound, even when employing a large number, e.g., 100+, of concurrent threads. There is a limit to how many threads can be deployed to restore any one front-end object, and retrieving relatively small pieces of data from object storage quickly consumes such threads. For example, there are only so many 50 KB-1 MB pieces can make up a front-end object and that will limit the number of threads that are possible. Accordingly, restore/read request throughput is a concern.

Various embodiments and approaches described herein include aggregating read requests requesting common data objects into a common read operation in a data storage system for reducing latency that would otherwise result in the data storage system from using an extensive/unnecessary number of threads while retrieving data. Accordingly, as a result of aggregating the read requests, throughput in the data storage system is improved as compared to conventional data storage systems that use such an extensive/unnecessary number of threads while retrieving data. The net result is that overall latency is reduced, as fewer read requests are processed.

Figure 4:
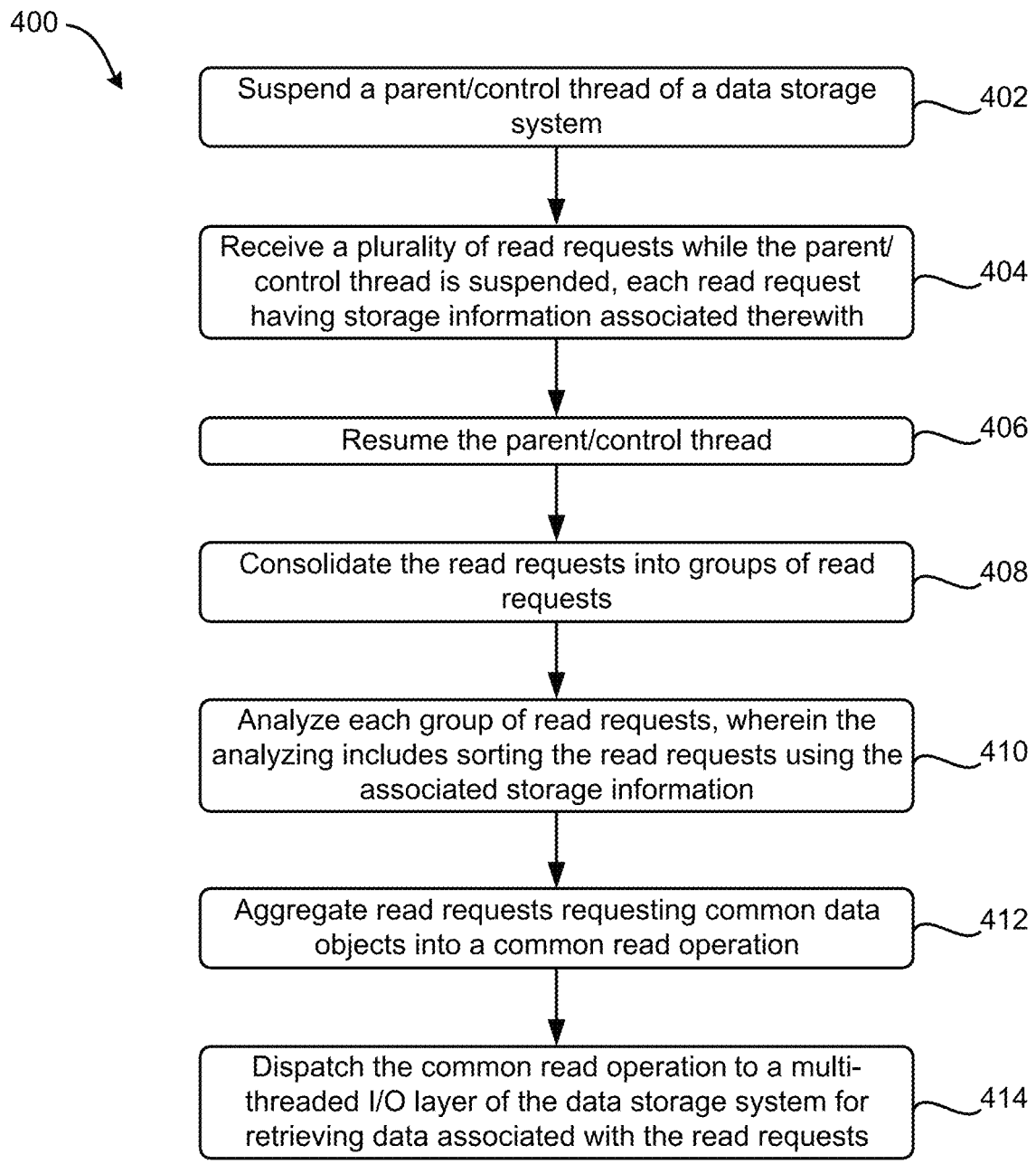
FIG. 4 is a flowchart of a method in accordance with one embodiment.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

According to various approaches, method 400 may be performed in any type of system. For example, in a preferred approach and as will be described in the present embodiment, method 400 is performed in a data storage system that is processing received read requests for data, e.g., where the data associated with the received read requests is stored on disc, magnetic recording tape, cloud based storage, etc. Moreover, method 400 may be implemented in any one or more portions of the data storage system, e.g., within an application, within any level of storage of the data storage system, etc. In a more specific approach, the data storage system in which method 400 is performed preferably utilizes a parent/control thread.

Operation 402 of method 400 includes suspending a parent/control thread of a data storage system, e.g., instructing the parent/control thread to sleep. The parent/control thread is responsible for analyzing a set of read requests (see operation 410) and dispatching them to IO worker threads (see operation 414). Note that such responsibilities of the parent/control thread are performed by the parent/control thread subsequent to resuming of the parent/control thread, e.g., see operation 406. Moreover, in one approach, the dispatching of the set of read requests is performed by the parent/control thread, and the worker threads are utilized for satisfying the read requests (as will be described elsewhere herein).

The duration that the parent/control thread is suspended may be based on any one or more factors. For example, the parent/control thread may be suspended for a predetermined amount of time, e.g., an amount of time that is preset by a user; an amount of time that it has previously taken for the data storage system to receive more than one read request; until a predetermined number of read requests are received; etc.

It should be noted that in some approaches, operation 402 may be optional, and the parent/control thread may remain resumed, e.g., awake, at all times. In some of such approaches, the parent/control thread may wait until a plurality of read requests are received before performing further operations, e.g., such as analyzing of the read requests which will be described in greater detail elsewhere herein (see operation 410). In another approach, the parent/control thread may pass the requests that are currently in the queue over to some other "control" type thread to process the requests.

Operation 404 of method 400 includes receiving a plurality of read requests while the parent/control thread is suspended. The read requests may be received from any one or more locations. For example, in one approach, at least some of the plurality of read requests are received from a deduplication layer of the data storage system. Accordingly, in some approaches, the data associated with at least some of the plurality of read requests may be for deduplicated data. According to another approach, at least some of the plurality of read requests are additionally and/or alternatively received from clients of users.

In preferred approaches, each read request has associated therewith, and preferably includes, storage information referring to the data requested. The storage information may be any type of information. In one approach, storage information associated with the read request includes information that is stored with metadata associated with the requested data. In another approach, storage information associated with a read request includes metadata associated with the requested data.

According to one approach, the associated storage information of one or more of the read requests includes information such as a container-ID, offset and/or length. The container-ID, e.g. such as a deduplication container-ID, may identify the physical and/or logical location at which the data associated with one or more of the read requests is stored. The associated offset is a starting address within the container at which the data associated with one or more of the read requests is read, e.g., an extent from which the offset is read. The associated length specifies a length of data that is to be read from the associated offset for retrieving the data associated with one or more of the read requests. In yet another approach, the storage information associated with a read request includes a size of the data requested by the read request, e.g., the size of storage resources consumed in storing the data requested by the read request.

In one approach, the plurality of read requests and/or the associated storage information are at least temporarily stored after being received by the data storage system. The plurality of received read requests and/or the associated storage information may be at least temporarily stored in any memory within and/or known by the data storage system. For example, the plurality of received read requests and/or the associated storage information may be at least temporarily stored in, e.g., flash memory, RAM, temporary memory, etc., depending on the approach. In preferred approaches, the plurality of read requests and/or the associated storage information are stored as entries in a hash/list structure while the parent/control thread is suspended. Accordingly, in some approaches, while the parent/control thread is suspended, the hash/list structure selectively remains unlocked, e.g., to allow such storing therein.

Operation 406 of method 400 includes resuming the parent/control thread, e.g., instructing the parent/control thread to wake, resume operations, etc. In one approach, read requests that are received while the parent/control thread is resumed are not added to the hash/list structure. Accordingly, in some approaches, while the parent/control thread is resumed, the hash/list structure selectively remains locked. Read requests that are received while the parent/control thread is resumed may be processed as usual, stored for subsequent consolidation with the next batch of read requests, etc. Instead of storing the read requests in the parent/control thread, the read requests may be stored at any other storage location.

The read requests that were received while the parent/control thread was suspended may, but do not have to be, consolidated into groups of read requests, e.g., see optional operation 408 of method 400. Depending on the approach, consolidation of read requests into groups is performed so that the plurality of read requests of each group may be analyzed against each other and/or read requests of another group. More specifically, in one approach, the read requests are consolidated into groups each including a manageable number and/or extent of read requests, e.g., manageable with respect to processing constraints of a processor that analyzes each group of read requests, as will be described elsewhere herein, e.g., see operation 410 of method 400.

Consolidation of the read requests into groups may be based on any one or more factors. For example, in some approaches, consolidation of some read requests into at least one group of read requests is based on time(s) that the read requests are received. For example, in one approach, read requests that are received within a predetermined amount of time, e.g., at least a portion of the time that the parent/control thread is suspended, are consolidated into the same group of read requests.

In some other approaches, consolidation of some read requests into at least one group of read requests is based on, e.g., a size of the hash/list structure, a length of a buffer of the data storage system, the size of the data associated with each read request, etc.

Operation 410 of method 400 includes analyzing the read requests, e.g., all of the read requests, in groups of the read requests at a time, etc. In preferred approaches, the analyzing includes sorting the read requests, e.g., using a known type of comparator, using the associated storage information, e.g., such as container-ID, associated offsets, associated lengths, etc.

For example, in one approach, the analyzing includes sorting the read requests based on the container-IDs associated with the read requests. In another approach, the analyzing additionally and/or alternatively includes sorting the read requests based on the offsets associated with the read requests. Moreover, in another approach, the analyzing additionally and/or alternatively includes sorting the read requests based on the lengths associated with the read requests. Ideally, the read requests are sorted according to container-IDs, offsets, and lengths.

Assuming that the associated storage information of the read requests is stored in and/or includes metadata, in one approach, the analyzing may additionally and/or alternatively include determining one or more ratios, where the ratio(s) each contrast a percent of common associated storage information with a percent of non-common associated storage information in at least two read requests of the same group.

In another approach, the analyzing may additionally and/or alternatively include sorting the read requests according to a processing consumption that would be expected to be consumed in retrieving data associated with the read requests. For example, such an analysis may use the associated storage information to generate a list that orders the read requests from a read request determined to potentially have a lowest expected processing consumption to a read request determined to potentially have a highest expected processing consumption, e.g., of a processor that is utilized in retrieving data associated with read requests.

Based on the analyzing of the read requests, read requests requesting common data objects are aggregated into a common read operation, e.g., see operation 412 of method 400. To clarify, in some approaches, a common read operation corresponds to at least two read requests that are requesting the same data. For example, in one approach, read requests that are requesting the same data may be characterized by the associated storage information of each of the read requests having the same container-IDs, associated offsets, and associated lengths. In such approaches, method 400 preferably includes collapsing the read operations of the read requests requesting common data objects into a single read operation.

In some other approaches, a common read operation corresponds to at least two read requests that are requesting similar data. For example, in one approach, read requests that are requesting the similar data may be characterized by the associated storage information of each of the read requests having the same container-IDs, but uncommon associated offsets and/or uncommon associated lengths, e.g., the requests are requesting overlapping data. In such approaches, method 400 optionally include collapsing the read operations of the read requests requesting common data objects into a single read operation.

Figure 5:
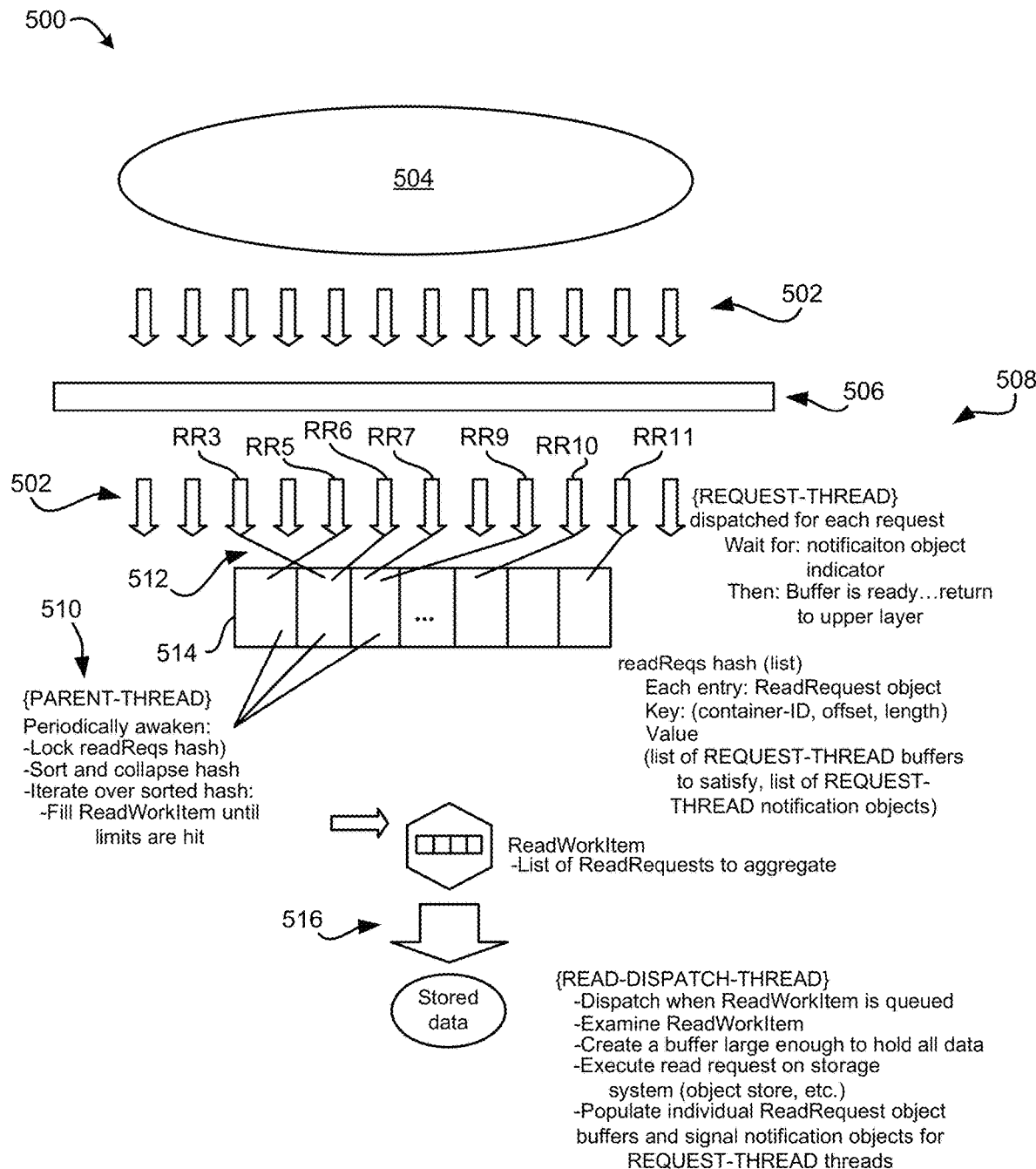
FIG. 5 is a representation of an architecture of a data storage system in accordance with one embodiment.

It should be noted that such common read operations are also referred to as ReadWorkItem(s) in some other approaches elsewhere herein, e.g., see ReadWorkItem of FIGS. 5, 6A and 6C.

In one or more approaches, how many read requests requesting the common data objects are aggregated into the common read operation is based at least in part on one or more conditions. The condition may include any type of condition.

In one approach, aggregating the read requests requesting the common data objects into the common read operation is performed until a condition is no longer true. For example, in one approach, the condition includes at least one entry being present in the hash/list structure. Such a condition ensures that aggregation of read requests is not unnecessarily waiting to aggregate an additional entry into the common read operation where the hash/list structure is empty. Accordingly, in such an approach, in response to determining that the hash/list structure is empty, it may be determined that that the condition is no longer true.

In another approach, the condition includes a container value associated with a most previously aggregated read request not changing. For example, in response to determining that a container value associated with a read request that is to be next aggregated is different than the container value associated with the most previously aggregated read request, it is determined that the condition is no longer true.

The condition may in one approach additionally and/or alternatively include a predetermined read aggregation size threshold of an aggregation buffer used for retrieving data associated with the common read operation not being exceeded. In such an approach, the predetermined read aggregation size threshold of the aggregation buffer may be at least based on a predetermined amount of processing resources, e.g., such as megabytes (MB), that is allotted to the aggregation buffer by the system in which method 400 is being performed. Such a condition ensures that read requests are not aggregated to an extent/amount that would adversely affect system performance, e.g., create a higher than average system latency in the system in which method 400 is being performed.

In another approach, the condition includes an amount of data unnecessarily read when retrieving data associated with the common read operation not exceeding a predefined wasted space value, e.g., a predetermined data size, a relative percentage, etc. The predefined wasted space value may be, e.g., preset by a user, preset by processing constrains of the data storage system, depend on the number of read requests received while the parent/control thread was most previously suspended, etc.

Depending on the approach, the predefined wasted space value may be any value or percentage of read data. For example, in one approach, in order to not unnecessarily read any data when retrieving data associated with the common read operation, the predefined wasted space value is set to zero.

In one approach, the predefined wasted space value may correspond to a percentage of data that is unnecessarily read when retrieving data associated with the common read operation. For purposes of a non-limiting example, assume that requested data associated with a common read operation includes two portions of data, with a portion of data that is not associated with the common read operation stored therebetween. In such an example, a single read operation may be used when retrieving the two portions of data that are associated with the common read operation, and because the portion of data that is not associated with the common read operation is stored therebetween, it would be read in the single read operation as well. Accordingly, the single read operation would include unnecessarily reading the portion of data that is not associated with the common read operation. Moreover, assume that in the present example the portion of data that is not associated with the common read operation makes up twenty percent of the data read during the single read operation, while the two portions of data that are associated with the common read operation make up the remaining eighty percent. Provided that the portion of data that is not associated with the common read operation (twenty percent of the total data read) is not an amount of data that exceeds a predefined wasted space value, it is determined that the condition remains true. However, in contrast, if the portion of data that is not associated with the common read operation (twenty percent of the total data read) is an amount of data that exceeds a predefined wasted space value, it is determined that the condition is no longer true.

In another approach, the predefined wasted space value may correspond to a percentage of the resources of the aggregation buffer that are unnecessarily consumed in unnecessarily reading data that is not associated with the common read operation.

According to various approaches, the aggregation may be performed at one or more locations within the data storage system, using any one or more techniques. For example, in one approach, the aggregation is performed using software within the parent/control thread layer. In another approach, the aggregation is performed by a dedicated processor within the data storage system. Further examples of aggregating read requests requesting common data objects into common read operations is described in further detail elsewhere below, e.g., see ReadWorkItem of FIGS. 5, 6A, and 6C.

Operation 414 of method 400 includes dispatching the common read operation to the multi-threaded I/O layer of the data storage system for retrieving data associated with the read requests. In some approaches, dispatching the common read operations is performed (by the parent/control thread) in response to determining that a condition is no longer true, e.g., see the various conditions mentioned elsewhere above.

In dispatching the common read operation, fewer read operations are performed than would otherwise be performed in fulfilling the read requests by performing at least one read operation for each received read request. This is beneficial for a number of reasons, which will now be detailed below.

One benefit enabled by method 400 and/or various other approaches described herein includes the ability to perform such operations in conjunction with data deduplication. This is not otherwise available in conventional data storage system practices which typically disable deduplication in an attempt to reduce latency and as a result, thereby lose data reduction benefits of deduplication.

Another benefit enabled by method 400 and/or various other approaches described herein includes an increase to front-end throughput for clients that utilize data storage systems in which such approaches are implemented. For example, as a direct result of less threads being utilized for retrieving data associated with common read requests, the Recovery Time Objective (RTO) of a backup solution within such data storage systems is refined. This benefit should be contrasted with conventional data storage systems, which diminish RTO by using a different thread for every read operation.

One of ordinary skill in the art upon reading the descriptions herein will realize the potential for implementing one or more of the approaches and/or embodiments described herein to an existing data protection solution in an agnostic manner. In one approach, subsequent such an implementation, an upper level deduplication layer of the new data storage system that is responsible for satisfying front-end object restore requests can continue to function as-is. Moreover, the I/O layer would be preempted to more effectively organize and execute object storage read requests using various operations described herein, e.g., such as dispatching the common read operations to the now multi-threaded I/O layer of the data storage system for retrieving data associated with the read requests as opposed to conventional practices of using a unique thread for each read operation.

In one approach, an alternative to implementing one or more of the approaches and/or embodiments described herein to an existing data protection solution in an agnostic manner as described above, includes re-architecting the deduplication layer of a data storage system. However, it should be noted that this alternative re-architecting of the deduplication layer may carry significant financial costs in doing so.

Yet another benefit enabled by method 400 and/or various other approaches described herein includes the ability to achieve relatively higher restore rate capabilities than conventional data storage systems. For example, as previously mentioned, recall that processes in which conventional data storage systems satisfy read requests typically include using an extensive number of concurrent threads, e.g., 100+. These large number of threads typically retrieve only sub-portions of requested data, and are extensive in that such threads are deployed without considering whether another thread is already retrieving the same sub-portion of data. Accordingly, these conventional techniques of data retrieval spur unnecessary latency in the conventional data storage system. This latency compromises restore/read request throughput. In sharp contrast, method 400 and/or various other approaches described herein aggregate read requests requesting common data objects into common read operations. Accordingly, relatively fewer I/O threads are used in retrieving data associated with read requests than would otherwise be used in the above described conventional data storage systems. Moreover, restore rates, at least in a majority of typical read requests, are similarly greater than would otherwise be available in conventional data storage systems, because several of the current approaches/embodiments do not include scaling to an infeasible number of concurrent I/O threads when satisfying a read request.

It should be noted that attempts using additional I/O threads to restore extents in parallel with REST calls is not a sufficient remedy to the deficiencies of conventional data storage systems mentioned herein, as such attempts will reach a point of diminishing returns.

With reference again to operation 414 of method 400, according to various approaches, dispatching the common read operation to a multi-threaded I/O layer of the data storage system may include use of I/O reader threads. In a preferred approach, at least one I/O reader thread is utilized for performing a read and satisfying a waiting thread, e.g., a deduplication layer thread that is waiting for a buffer to be filled for an extent restore, that is satisfied by at least one I/O reader thread performing a read. The I/O reader threads may execute a REST call, e.g., using HTTP such as a GET protocol, to retrieve/fetch the data associated with at least one read request from an object storage portion of the data storage system. Once the data associated with the at least one read request is retrieved from an object storage portion of the data storage system, the I/O reader threads parcel out the data into applicable memory buffers that the waiting threads are waiting on. In some approaches, where the retrieved data corresponds to aggregated read requests, multiple waiting threads each requesting different extents may be satisfied by the retrieved data.

It should be noted that in some approaches, method 400 includes determining that one or more read requests do not request common data objects as other read requests in the same group. In such approaches, one or more optional operations may be performed in an attempt to aggregate read operations of the read requests requesting uncommon data with one or more read operations of other read requests. For example, in one approach, the read requests requesting uncommon data may be grouped into a different group of read requests, e.g., in anticipation that the different group may include read requests requesting common data objects as the read requests requesting uncommon data. In another approach, the read requests requesting uncommon data may remain stored in the hash/list structure for later analysis, e.g., such as after one or more additional received read requests are stored in the hash/list structure during a subsequent suspending of the parent/control thread. Alternatively, in response to determining that a read request does not request common data objects as other read requests in the same group, method 400 optionally includes dispatching the read request that does not request common data objects as other read requests in the same group to the multi-threaded I/O layer of the data storage system.

In some approaches, the multi-threaded I/O layer includes a thread pool that is utilized each time a thread is needed for retrieving data associated with the read requests.

In response to one or more read operations being dispatched to a multi-threaded I/O layer of the data storage system, according to one approach, the parent/control thread is suspended, e.g., to allow receipt of read requests.

It should be noted that although various approaches of method 400 are described to process read requests received during suspension of the parent/control thread, in some approaches, the read requests of method 400 may additionally and/or alternatively include read requests that already exist in a queue that is known by the parent/control thread. In such approaches of method 400, the parent/control thread may receive and/or access such read requests at any time. In another approach, the parent/control thread may pass the requests that are currently in the queue over to some other "control" type thread to process the requests.

FIG. 5 depicts a representation of an architecture 500 for creating and dispatching common read operations of aggregated read requests requesting common data objects, thereby improving throughput in a data storage system, which in turn reduces overall latency, in accordance with one embodiment. As an option, the present architecture 500 may be implemented in conjunction with features from any other embodiment listed herein, such as those described with reference to the other FIGS., e.g., the process of FIG. 4 may be performed in the environment of FIG. 5 in some approaches. Of course, however, such architecture 500 and others presented herein may be used in various applications and/or in permutations which may or may not be specifically described in the illustrative embodiments listed herein. Further, the architecture 500 presented herein may be used in any desired environment.

As will be described in greater detail below, architecture 500 includes implementation of a multi-threaded read-aggregation layer in a data storage system, above an object storage API so as to minimize the quantity of latency-intensive read operations that are performed in satisfying received read requests. This implementation may be inserted below an existing multi-threaded parallel read layer of the data storage system and may be opaque to this layer. The above layer, which may be referred to as a de-duplication layer, may be agnostic to what source the data is restored from, e.g., disc, cloud object storage, magnetic recording tape, etc.

The architecture 500 includes a data storage system 508 in which read requests 502 are received, e.g., while a parent/control thread 510 of the data storage system 508 is suspended. In the present approach, the read requests 502 are received, e.g., received by a multi-threaded I/O layer 506 of the data storage system 508, from an application layer 504 (e.g., deduplication layer), however, such read requests may be received from any source.

Depending on the approach, the received read requests 502 may request any type and/or extent of data. For example, in the present approach, the received read requests 502 may be assumed to correspond to requests for instances of deduplicated data. Each read request preferably has storage information associated therewith.

According to some specific approaches, the read requests 502 may be generated for restore requests of, e.g., front-end objects, file databases, virtual machines, etc. Moreover, the requests may be out of order and not aggregated. In other words, each of the received read requests 502 may correspond to read operations that are to be performed on various data sub-portions of larger data of containers in the data storage system 508. For example, in one approach, the read requests 502 request data sub-portions of one or more container files, container objects, etc.

In some approaches, the read requests are consolidated into groups of read requests. In one approach, consolidation of read requests into groups of read requests includes adding read requests that are received while the parent/control thread is suspended, to at least one hash/list structure, e.g., see hash/list structure 514. Accordingly, the hash/list structure is unlocked while the parent/control thread is suspended.

In some approaches, a request thread is generated for each of the received read requests 502, e.g. see request threads 512, where each of the request threads 512 are associated with read operations for reading data associated with the read requests 502. Note that, for simplified viewing purposes, only seven of the read requests 502 are shown to include request threads 512, e.g., see read requests: RR3, RR5, RR6, RR7, RR9, RR10, and RR11.

Periodically, the parent/control thread 510 is resumed. In one approach, in response to the parent/control thread 510 being resumed, the hash/list structure is locked.

Each group of read requests is analyzed. In some preferred approaches the analyzing includes sorting the read requests using the associated storage information, e.g., associated container-ID, associated offset, associated length, etc. In one approach, analyzing of the read requests may be performed by the parent/control thread, e.g., see pseudocode 600 of FIG. 6A.

With reference again to the hash/list structure 514, at least some of the read requests request common data objects. For example, note that the request threads 512 associated with the read request RR3 and read request RR6 point to a common hash entry of the hash/list structure 514 and thus have common read operations. Moreover, the read request RR7 and read request RR9 point to a common hash entry of the hash/list structure 514 and thus can be consolidated into a common read operation. Accordingly, in order to avoid duplicate effort/unnecessarily performing duplicate read operations, read requests requesting common data objects are aggregated into common read operations. For example, in one approach, the aggregation includes linking the read requests having common data objects to a common buffer that is used to dispatch the common read operations as a single read operation. More specifically, in the current approach, the requests thread, e.g., see {REQUEST-THREAD}, is utilized for aggregating the read requests having common data objects into common read operations, e.g., see ReadWorkItem. Note that pseudocode 620 of FIG. 6B may be referenced as a further example of utilization of request threads for aggregating read requests.

With continued reference to FIG. 5, the common read operations are dispatched to a multi-threaded I/O layer of the data storage system 508 for retrieving data associated with the read requests 502, e.g., see arrow 516. In one approach, dispatching of the common read operations may be performed by the parent/control thread, e.g., see pseudocode 640 of FIG. 6C.

Subsequent to the dispatching of the common read operations, the multi-threaded I/O layer of the data storage system 508 may utilize read-dispatch threads for retrieving the data associated with the read requests, e.g., see {READ-DISPATCH-THREAD}. Moreover, in approaches in which application threads of the application layer are suspended while waiting for requested data, such read-dispatch threads may additionally and/or alternatively be utilized for resuming the suspended application threads.

In the current approach, the retrieved data associated with the read requests 502 is delivered to one or more of the applications of the application layer 504. In some approaches, each application of the application layer 504 may have a different buffer in memory that corresponds to one of the received read requests 502. In such approaches, each portion of the retrieved data is delivered to a corresponding buffer. Note that in response to multiple applications of the application layer 504 requesting common data objects, the common data object (that is preferably retrieved using a common read thread) is delivered to the buffers of each of the applications requesting common data objects. Moreover, in one approach, threads of the I/O layer notify such applications of the data objects being delivered.

In some approaches, application buffers are configured to at least temporarily store the retrieved data therein. Specifically, as previously mentioned in the descriptions of method 400, the size of dispatched common read operations are selectively not greater in storage size than the storage size of the buffers of the application layer 504.

FIGS. 6A-6C depict samples of pseudocode 600, 620, 640 for creating and dispatching a common read operation of aggregated read requests requesting common data objects in a data storage system, in accordance with various embodiments. As an option, the present pseudocode 600, 620, 640 may be implemented in conjunction with features from any other embodiment listed herein, such as those described with reference to the other FIGS., especially FIGS. 4 and 5. Of course, however, such pseudocode 600, 620, 640 and others presented herein may be used in various applications and/or in permutations which may or may not be specifically described in the illustrative embodiments listed herein. Further, the pseudocode 600, 620, 640 presented herein may be used in any desired environment.

The depicted examples of pseudo-code may be used for performing one or more of the operations described herein. It should be noted that various numerical values of the selected variables presented in FIGS. 6A-6C have been added for purposes of non-limiting examples. In preferred approaches, at least one of the examples of pseudocode 600, 620, 640 may be inserted below a deduplication layer of a backup solution of a data storage system. e.g., on the restore path in between the deduplication layer that may be attempting to restore one or more front-end client objects and the I/O layer of the object storage solution being communicated with.

To summarize, the pseudocode 600, 620, 640 may be used to periodically suspend a parent/control thread of a data storage system, to examine a set of received read requests representing extents that de-duplication layer threads are waiting on currently. Moreover, the pseudocode 600, 620, 640 may be used to re-order and collapse these entries into aggregated requests that are satisfied by a quantity of I/O worker threads (of a multi-threaded I/O layer of the data storage system) which may scale up to the same number of threads as the de-duplication layer has incoming (up to the maximum number of entries in the queue of extent read requests, in a most extreme case), e.g., see lines 602 of pseudocode 600 of FIG. 6A.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   suspending a parent/control thread of a data storage system;
   receiving a plurality of read requests while the parent/control thread is suspended, each read request having storage information associated therewith;
   adding the read requests, that are received while the parent/control thread is suspended, to a hash/list structure;
   resuming the parent/control thread;
   not adding read requests, that are received while the parent/control thread is resumed, to the hash/list structure;
   analyzing the added read requests, wherein the analyzing includes sorting the read requests using the associated storage information;
   aggregating read requests requesting common data objects into a common read operation; and
   dispatching the common read operation to a multi-threaded I/O layer of the data storage system for retrieving data associated with the read requests.

2. The computer-implemented method of claim 1, wherein aggregating the read requests requesting the common data objects into the common read operation is performed until a condition is no longer true, the condition being selected from the group consisting of: at least one entry is present in the hash/list structure, a container value associated with a most previously aggregated read request has not changed, a predetermined read aggregation size threshold of an aggregation buffer used for retrieving data associated with the common read operation has not been exceeded, and an amount of data unnecessarily read when retrieving data associated with the common read operation does not exceed a predefined wasted space value.

3. The computer-implemented method of claim 2, wherein the dispatching of the common read operation is performed in response to determining that the condition is no longer true.

4. The computer-implemented method of claim 1, wherein the associated storage information of at least one read request is selected from the group consisting of:
   an associated container-ID at which the data associated with one or more of the read requests is stored;
   an associated offset, wherein the associated offset is a starting address at which the data associated with one or more of the read requests is read; and
   an associated length, wherein the associated length specifies a length of data that is to be read past the associated offset for retrieving the data associated with one or more of the read requests.

5. The computer-implemented method of claim 1, wherein the data associated with at least some of the plurality of read requests include deduplicated data.

6. The computer-implemented method of claim 1, comprising: consolidating the read requests into groups; and in response to determining that a read request does not request common data objects as other read requests in the same group, dispatching the read request that does not request common data objects as other read requests in the same group to the multi-threaded I/O layer of the data storage system.

7. A computer program product, the computer program product comprising a computer readable storage medium having program instructions embodied therewith, wherein the computer readable storage medium is not a transitory signal per se, the program instructions readable and/or executable by a computer to cause the computer to perform a method comprising:
   suspending a parent/control thread of a data storage system;
   receiving, by the computer, a plurality of read requests, each read request having storage information associated therewith;
   adding, by the computer, read requests that are received while a parent/control thread is suspended, to a hash/list structure;
   analyzing, by the computer, the added read requests, wherein the analyzing includes sorting the read requests using the associated storage information;
   aggregating, by the computer, read requests requesting common data objects into a common read operation;
   stopping aggregation of the read requests requesting the common data objects into the common read operation in response to a determination that an amount of data unnecessarily read when retrieving data associated with the common read operation exceeds a predefined wasted space value; and
   dispatching, by the computer, the common read operation to a multi-threaded I/O layer of the data storage system for retrieving data associated with the read requests.

8. The computer program product of claim 7, the program instructions readable and/or executable by the computer to cause the computer to perform the method comprising: resuming the parent/control thread.

9. The computer program product of claim 8, the program instructions readable and/or executable by the computer to cause the computer to perform the method comprising: not adding read requests that are received while the parent/control thread is resumed, to the hash/list structure.

10. The computer program product of claim 7, the program instructions readable and/or executable by the computer to cause the computer to perform the method comprising: stopping aggregation of the read requests requesting the common data objects into the common read operation in response to a determination that a condition is no longer true, the condition being selected from the group consisting of: at least one entry is present in the hash/list structure, a container value associated with a most previously aggregated read request has not changed, and a predetermined read aggregation size threshold of an aggregation buffer used for retrieving data associated with the common read operation has not been exceeded.

11. The computer program product of claim 10, wherein the dispatching of the common read operation is performed in response to determining that the condition is no longer true.

12. The computer program product of claim 7, wherein the associated storage information of at least one read request is selected from the group consisting of:
   an associated container-ID at which the data associated with one or more of the read requests is stored;
   an associated offset, wherein the associated offset is a starting address at which the data associated with one or more of the read requests is read; and
   an associated length, wherein the associated length specifies a length of data that is to be read past the associated offset for retrieving the data associated with one or more of the read requests.

13. The computer program product of claim 7, wherein the data associated with at least some of the plurality of read requests include deduplicated data.

14. The computer program product of claim 7, the program instructions readable and/or executable by the computer to cause the computer to perform the method comprising: consolidating the read requests into groups; and in response to determining that a read request does not request common data objects as other read requests in the same group, dispatching, by the computer, the read request that does not request common data objects as other read requests in the same group to the multi-threaded I/O layer of the data storage system.

15. A system, comprising:
a processor; and
logic integrated with the processor, executable by the processor, or integrated with and executable by the processor, the logic being configured to:
suspend a parent/control thread of a data storage system;
receive a plurality of read requests while the parent/control thread is suspended, each read request having storage information associated therewith;
add the read requests, that are received while the parent/control thread is suspended, to a hash/list structure;
analyze the added read requests, wherein the analyzing includes sorting the read requests using the associated storage information;
aggregate read requests requesting common data objects into a common read operation;
stop aggregation of the read requests requesting the common data objects into the common read operation in response to a determination that a container value associated with a most previously aggregated read request has changed; and
dispatch the common read operation to a multi-threaded I/O layer of the data storage system for retrieving data associated with the read requests.

16. The system of claim 15, the logic being configured to: resume the parent/control thread.

17. The system of claim 16, the logic being configured to: not add read requests that are received while the parent/control thread is resumed, to the hash/list structure.

18. The system of claim 15, the logic being configured to: stop aggregation of the read requests requesting the common data objects into the common read operation in response to a determination that a condition is no longer true, the condition being selected from the group consisting of: at least one entry is present in the hash/list structure, a predetermined read aggregation size threshold of an aggregation buffer used for retrieving data associated with the common read operation has not been exceeded, and an amount of data unnecessarily read when retrieving data associated with the common read operation does not exceed a predefined wasted space value.

* * * * *